(12) United States Patent
Lietz et al.

(10) Patent No.: US 9,516,044 B2
(45) Date of Patent: Dec. 6, 2016

(54) METHOD AND SYSTEM FOR CORRELATING SELF-REPORTING VIRTUAL ASSET DATA WITH EXTERNAL EVENTS TO GENERATE AN EXTERNAL EVENT IDENTIFICATION DATABASE

(71) Applicant: Intuit Inc., Mountain View, CA (US)

(72) Inventors: M. Shannon Lietz, San Marcos, CA (US); Luis Felipe Cabrera, Bellevue, WA (US)

(73) Assignee: Intuit Inc., Mountain View, CA (US)

( * ) Notice: Subject to any disclaimer, the term of this patent is extended or adjusted under 35 U.S.C. 154(b) by 24 days.

(21) Appl. No.: 14/448,405

(22) Filed: Jul. 31, 2014

(65) Prior Publication Data

US 2016/0036835 A1    Feb. 4, 2016

(51) Int. Cl.
*H04L 29/06* (2006.01)
*G06F 11/30* (2006.01)

(52) U.S. Cl.
CPC ....... *H04L 63/1416* (2013.01); *G06F 11/3072* (2013.01); *H04L 63/1458* (2013.01)

(58) Field of Classification Search
CPC .............. H04L 63/1416; H04L 63/1458; G06F 11/3072
USPC ......................................................... 726/22
See application file for complete search history.

(56) References Cited

U.S. PATENT DOCUMENTS

| | | |
|---|---|---|
| 6,202,066 B1 | 3/2001 | Barkley et al. |
| 7,228,438 B2 | 6/2007 | Bushmitch et al. |
| 7,437,764 B1 | 10/2008 | Sobel et al. |
| 7,574,746 B2 | 8/2009 | Hill et al. |
| 7,577,722 B1 | 8/2009 | Khandekar et al. |

(Continued)

FOREIGN PATENT DOCUMENTS

| | | | |
|---|---|---|---|
| CN | 101374051 | 2/2009 | |
| WO | WO 2009079648 A1 * | 6/2009 | ............. H04L 41/28 |

(Continued)

OTHER PUBLICATIONS

Gryb et al., "Method and System for Validating a Virtual Asset," U.S. Appl. No. 14/070,050, filed Nov. 1, 2013.

(Continued)

*Primary Examiner* — Hadi Armouche
*Assistant Examiner* — Angela Holmes
(74) *Attorney, Agent, or Firm* — Hawley Troxell Ennis & Hawley LLP; Philip McKay

(57) ABSTRACT

A method and system for correlating patterns of operating virtual assets with external events includes receiving an identification of one of the external events, from one or more electronic sources, and receiving first patterns from one or more first virtual assets, according to one embodiment. The method and system include populating a database with the first patterns and the identification of the one of the external events to map the one of the external events to the first patterns, according to one embodiment. The method and system include receiving second patterns from one or more second virtual assets, and comparing the second patterns to the first patterns, according to one embodiment. The method and system include distributing the identification of the one of the external events to the one or more second virtual assets, if the second patterns are similar to the first patterns, according to one embodiment.

29 Claims, 4 Drawing Sheets

(56) References Cited

U.S. PATENT DOCUMENTS

| | | |
|---|---|---|
| 7,640,458 B2 | 12/2009 | Rao et al. |
| 7,779,247 B2 | 8/2010 | Roegner |
| 7,792,256 B1 | 9/2010 | Arledge et al. |
| 7,925,923 B1 | 4/2011 | Hyser et al. |
| 8,132,231 B2 | 3/2012 | Amies et al. |
| 8,341,625 B2 | 12/2012 | Ferris et al. |
| 8,347,281 B2 | 1/2013 | Arsenault et al. |
| 8,639,923 B2 | 1/2014 | Lo et al. |
| 8,656,482 B1 | 2/2014 | Tosa et al. |
| 8,688,820 B1 | 4/2014 | Bhogi et al. |
| 8,799,431 B2 | 8/2014 | Pabari |
| 2004/0010571 A1 | 1/2004 | Hutchinson et al. |
| 2005/0108571 A1 | 5/2005 | Lu et al. |
| 2005/0155013 A1 | 7/2005 | Carrigan |
| 2005/0183138 A1 | 8/2005 | Phillips et al. |
| 2005/0193231 A1 | 9/2005 | Scheuren |
| 2006/0101519 A1 | 5/2006 | Lasswell et al. |
| 2006/0248573 A1 | 11/2006 | Pannu et al. |
| 2007/0043860 A1 | 2/2007 | Pabari |
| 2007/0101400 A1 | 5/2007 | Freeman et al. |
| 2007/0169204 A1 | 7/2007 | Janakiraman et al. |
| 2007/0204346 A1 | 8/2007 | Meier |
| 2007/0250424 A1 | 10/2007 | Kothari |
| 2008/0256639 A1 | 10/2008 | Onoda et al. |
| 2009/0172788 A1 | 7/2009 | Vedula et al. |
| 2009/0177717 A1 | 7/2009 | Meehan et al. |
| 2010/0030878 A1 | 2/2010 | Grabowski et al. |
| 2010/0057660 A1 | 3/2010 | Kato |
| 2010/0070964 A1 | 3/2010 | Blumfield et al. |
| 2010/0076987 A1 | 3/2010 | Schreiner |
| 2010/0235828 A1 | 9/2010 | Nishimura et al. |
| 2010/0251363 A1 | 9/2010 | Todorovic |
| 2011/0067097 A1 | 3/2011 | Park et al. |
| 2011/0107398 A1 | 5/2011 | Earl et al. |
| 2011/0197065 A1 | 8/2011 | Stauth et al. |
| 2011/0258692 A1 | 10/2011 | Morrison et al. |
| 2012/0151553 A1 | 6/2012 | Burgess et al. |
| 2012/0240193 A1 | 9/2012 | Littlefield et al. |
| 2012/0266167 A1 | 10/2012 | Spiers et al. |
| 2012/0291094 A9 | 11/2012 | Forrester et al. |
| 2012/0304300 A1 | 11/2012 | LaBumbard |
| 2012/0324446 A1 | 12/2012 | Fries et al. |
| 2013/0091376 A1 | 4/2013 | Raspudic et al. |
| 2013/0097701 A1 | 4/2013 | Moyle et al. |
| 2013/0117567 A1 | 5/2013 | Chang et al. |
| 2013/0124712 A1 | 5/2013 | Parker |
| 2013/0247133 A1 | 9/2013 | Price et al. |
| 2013/0247207 A1 | 9/2013 | Hugard et al. |
| 2013/0304693 A1 | 11/2013 | Jaeger et al. |
| 2013/0318599 A1 | 11/2013 | Fadida et al. |
| 2013/0326580 A1 | 12/2013 | Barclay et al. |
| 2014/0040299 A1 | 2/2014 | Datla et al. |
| 2014/0047546 A1 | 2/2014 | Sidagni |
| 2014/0109192 A1 | 4/2014 | Pidault et al. |
| 2014/0165130 A1 | 6/2014 | Zaitsev |
| 2014/0196104 A1 | 7/2014 | Chari et al. |
| 2014/0282889 A1 | 9/2014 | Ishaya et al. |

FOREIGN PATENT DOCUMENTS

| | | |
|---|---|---|
| WO | WO 2012/023657 | 2/2012 |
| WO | WO 2013/123548 | 8/2013 |

OTHER PUBLICATIONS

Weaver et al., "Method and System for Providing and Dynamically Deploying Hardened Task Specific Virtual Hosts," U.S. Appl. No. 14/070,124, filed Nov. 1, 2013.

Cabrera et al., "Method and System for Dynamically and Automatically Managing Resource Access Permissions," U.S. Appl. No. 14/078,715, filed Nov. 13, 2013.

Cabrera et al., "Method and System for Providing a Robust and Efficient Virtual Asset Vulnerability Management and Verification Service," U.S. Appl. No. 14/186,801, filed Feb. 21, 2014.

Lietz et al., "Method and System for Providing an Efficient Vulnerability Management and Verification Service," U.S. Appl. No. 14/192,529, filed Feb. 27, 2014.

Lietz et al., "Method and System for Providing Temporary Secure Access Enabled Virtual Assets," U.S. Appl. No. 14/217,653, filed Mar. 18, 2014.

Lietz et al., "Method and System for Providing Self-Monitoring, Self-Reporting, and Self-Repairing Virtual Assets in a Cloud Computing Environment," U.S. Appl. No. 14/256,289, filed Apr. 18, 2014.

Cabrera et al., "Method and System for Providing Automated Self-Healing Virtual Assets," U.S. Appl. No. 14/448,326, filed Jul. 31, 2014.

Schwarzkopf et al., "Increasing Virtual Machine Security in Cloud Environments," *Journal of Cloud Computing: Advances, Systems and Applications*, Jul. 2012, pp. 1-12.

"VMware Backdoor I/O Port," [online], [retrieved Sep. 2, 2015]. Retrieved from the internet. <URL: http://sites.google.com/site/chitchatvmback/backdoor>.

"What is the Virtual Machine Backdoor," [online], [retrieved Sep. 2, 2015]. Retrieved from the internet. <URL: http://communities.vmware.com/thread/228415?start=0&start=0>.

\* cited by examiner

METHOD AND SYSTEM FOR CORRELATING SELF-REPORTING VIRTUAL ASSET DATA WITH EXTERNAL EVENTS TO GENERATE AN EXTERNAL EVENT IDENTIFICATION DATABASE

BACKGROUND

Security threat mechanisms in computing systems may use a variety of techniques for detecting potential security threats. Some techniques may include comparing the communications traffic of the computing system to one or more digital signatures that are indicative of known security threats. Other operational characteristics of the computing systems can also be monitored to assist in detecting potential security threats. However, when a computing system detects operational characteristics that exceed normal operational characteristics and that do not match patterns that are indicative of a known security threat, the computing system may have to cease operations, e.g., providing services to users, until one or more human resources evaluate the anomalous operational characteristics detected by the computing system.

What is needed is a method and system for correlating data or patterns from computing systems or virtual assets with external events to provide additional explanations for deviations in normal operating characteristics.

SUMMARY

In accordance with one embodiment, a method and system for correlating virtual asset patterns with external events includes receiving, with a first computing environment, an identification of one of the external events, from one or more electronic sources. The method and system include receiving first patterns from one or more first virtual assets, according to one embodiment. Each of the one or more first virtual assets may provide one or more computing services to one or more users. Each of the one or more first virtual assets may include an allocation of one or more hardware and software resources from a second computing environment. The first patterns may represent first operational characteristics of the one or more first virtual assets. The method and system include populating a database with the first patterns and the identification of the one of the external events to map the one of the external events to the first patterns, according to one embodiment. The method and system include receiving second patterns from one or more second virtual assets, where the second patterns represent second operational characteristics of the one or more second virtual assets, according to one embodiment. The method and system include comparing the second patterns to the first patterns, and distributing the identification of the one of the external events to the one or more second virtual assets, if the second patterns are similar to the first patterns, according to one embodiment.

In accordance with one embodiment, a method and system for managing a collection of security threats within a computing environment includes receiving, with the computing environment, a first security threat against a first virtual asset, where the first security threat is detected by the first virtual asset and the first virtual asset is hosted by the computing environment, according to one embodiment. The first virtual asset may represent an allocation of hardware and software resources within the computing environment for management by a tenant, and the first virtual asset may provide one or more services to one or more users. The method and system include adding the first security threat to the collection of security threats, where the collection of security threats may be hosted by the computing environment, according to one embodiment. The method and system include receiving a request from a second virtual asset for a status of the collection of security threats, in response to detection of changes in network performance within the computing environment by the second virtual asset, and transmitting the status of the collection of security threats to the second virtual asset, according to one embodiment.

Figure 1:
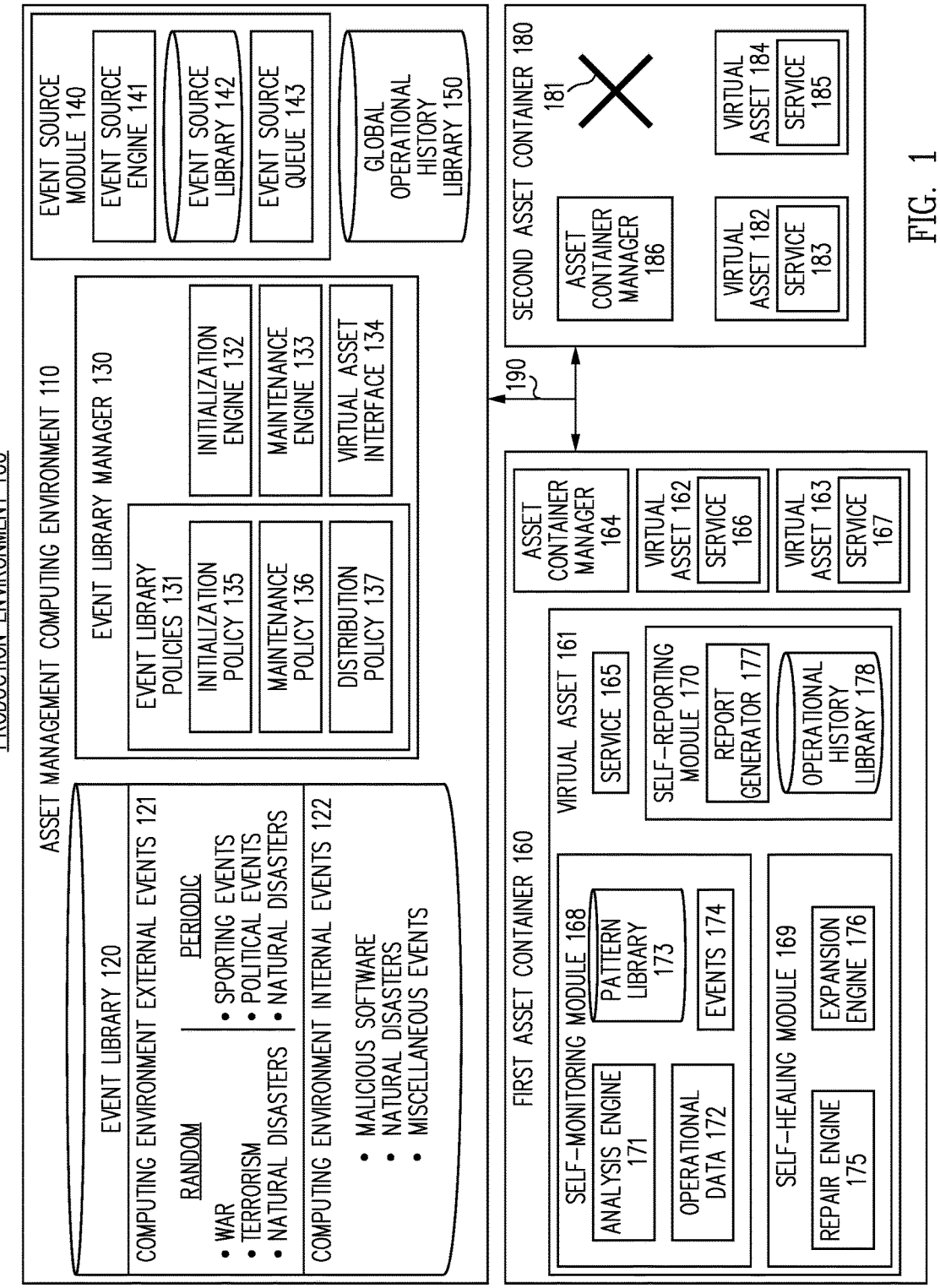
FIG. 1 is a block diagram of a hardware architecture for correlating virtual asset patterns with external events, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

The INTRODUCTORY SYSTEM, HARDWARE ARCHITECTURE, and PROCESS sections herein include systems and processes suitable for correlating virtual asset patterns with external events, according to various embodiments.

Introductory System

Herein, the term "production environment" includes the various components, or assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As specific illustrative examples, the assets making up a given production environment can include, but are not limited to, one or more computing environments used to implement the application in the production environment such as a data center, a cloud computing environment, a dedicated hosting environment, and/or one or more other computing environments in which one or more assets used by the application in the production environment are implemented; one or more computing systems or computing entities used to implement the application in the production environment; one or more virtual assets used to implement the application in the production environment; one or more supervisory or control systems, such as hypervisors, or other monitoring and management systems, used to monitor and control assets and/or components of the production environment; one or more communications channels for sending and receiving data used to implement the application in the production environment; one or more access control systems for limiting access to various components of the production environment, such as firewalls and gateways; one or more traffic and/or routing systems used to direct, control, and/or buffer, data traffic to components of the production environment, such as routers and switches; one or more communications endpoint proxy systems used to buffer, process, and/or direct data traffic, such as load balancers or buffers; one or more secure communication protocols and/or endpoints used to encrypt/decrypt data, such as Secure Sockets Layer (SSL) protocols, used to implement the application in the production environment; one or more databases used to store data in the production environment; one or more internal or external services used to implement the application in the production environment; one or more backend systems, such as backend servers or other hardware used to process data and implement the application in the production environment; one or more software systems used to implement the application in the production environment; and/or any other assets/components making up an actual production environment in which an application is deployed, implemented, accessed, and run, e.g., operated, as discussed herein, and/or as known in the art at the time of filing, and/or as developed after the time of filing.

As used herein, the terms "computing system", "computing device", and "computing entity", include, but are not limited to, a virtual asset; a server computing system; a workstation; a desktop computing system; a mobile computing system, including, but not limited to, smart phones, portable devices, and/or devices worn or carried by a user; a database system or storage cluster; a switching system; a router; any hardware system; any communications system; any form of proxy system; a gateway system; a firewall system; a load balancing system; or any device, subsystem, or mechanism that includes components that can execute all, or part, of any one of the processes and/or operations as described herein.

In addition, as used herein, the terms computing system and computing entity, can denote, but are not limited to, systems made up of multiple: virtual assets; server computing systems; workstations; desktop computing systems; mobile computing systems; database systems or storage clusters; switching systems; routers; hardware systems; communications systems; proxy systems; gateway systems; firewall systems; load balancing systems; or any devices that can be used to perform the processes and/or operations as described herein.

As used herein, the term "computing environment" includes, but is not limited to, a logical or physical grouping of connected or networked computing systems and/or virtual assets using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computing systems and/or virtual assets making up the trusted computing environment, are either under the control of, or known to, a party. Examples of trusted computing environments include the assets and components making up data centers associated with, and/or controlled by, an application and/or any computing systems and/or virtual assets, and/or networks of computing systems and/or virtual assets, associated with, known by, and/or controlled by, an application.

In contrast, unknown, or untrusted computing environments are environments and systems where the assets, components, infrastructure, communication and networking systems, and security systems implemented and associated with the computing systems and/or virtual assets making up the untrusted computing environment, are not under the control of, and/or are not known by, a party, and/or are dynamically configured with new elements capable of being added that are unknown to the party. Examples of untrusted computing environments include, but are not limited to, public networks, such as the Internet, various cloud-based computing environments, and various other forms of distributed computing systems.

In various embodiments, each computing environment includes allocated assets and virtual assets associated with, and controlled or used to create, and/or deploy, and/or operate an application.

It is often the case that to create, and/or deploy, and/or operate an application, application data must be transferred between an untrusted computing environment and a trusted computing environment. However, in other situations a party may wish to transfer data between two trusted computing environments, and/or two untrusted computing environments.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, ATMs, electronic voting machines, etc., located within a data center, within a cloud computing environment, and/or any other physical or logical location, as discussed herein, and/or as known/available in the art at the time of filing, and/or as developed/made available after the time of filing.

In various embodiments, any, or all, of the assets making up a given production environment discussed herein, and/or as known in the art at the time of filing, and/or as developed after the time of filing, can be implemented as one or more virtual assets.

Typically, virtual assets are created, or instantiated, using steps, instructions, processes, code, or "recipes" referred to herein as "virtual asset creation templates." Typically, virtual assets that have the same, or similar, operational parameters are created using the same or similar "virtual asset creation templates."

Examples of virtual asset creation templates include, but are not limited to, any tool and/or system for creating and managing a collection of related cloud resources. Illustrative examples of such a virtual asset creation template are any of the cloud formation templates/tools provided by Amazon Web Service (AWS), Rack Space, Joyent, and/or any other of the numerous cloud based infrastructure providers.

Other examples of virtual asset creation templates include, but are not limited to, any configuration management tool associated with, and/or used to create, virtual assets. One specific illustrative example of such a virtual asset creation template is a cookbook or recipe tool such as a Chef Recipe or system or any other fundamental element, or set of elements, used to override the default settings on a node within an infrastructure or architecture.

Other examples of virtual asset creation templates include, but are not limited to, any virtual appliance used to instantiate virtual assets. One specific illustrative, example of such a virtual asset creation template is an Amazon Machine Image (AMI), and/or similar functionality provided by Amazon Web Service (AWS), Rack Space, Joyent, and/or any other of the numerous cloud based infrastructure providers.

Other examples of virtual asset creation templates include, but are not limited to, any appliance, or tool, or system, or framework, used to instantiate virtual assets as discussed herein, and/or as known/available in the art at the time of filing, and/or as developed/made available after the time of filing.

Herein virtual assets that have the same, or similar, operational parameters and are created by the same or similar virtual asset creation template are generically referred to as virtual assets of the same "class." Examples of virtual asset classes include, but are not limited to, virtual machine classes; virtual server classes; virtual database or data store classes; self-monitoring virtual assets including specific types of instances instantiated in a cloud environment; application development process classes; and application classes.

In one embodiment, two or more assets, such as computing systems and/or virtual assets, and/or two or more computing environments, are connected by one or more communications channels including but not limited to, Secure Sockets Layer communications channels and various other secure communications channels, and/or distributed computing system networks, such as, but not limited to: a public cloud; a private cloud; a virtual private network (VPN); a subnet; any general network, communications network, or general network/communications network system; a combination of different network types; a public network; a private network; a satellite network; a cable network; or any other network capable of allowing communication between two or more assets, computing systems, and/or virtual assets, as discussed herein, and/or available or known at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, any general network, communications network, or general network/communications network system; a wireless network; a wired network; a wireless and wired combination network; a satellite network; a cable network; any combination of different network types; or any other system capable of allowing communication between two or more assets, virtual assets, and/or computing systems, whether available or known at the time of filing or as later developed.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "tenant" includes, but is not limited to, any user that enters a relationship, agreement, and/or contract, with an asset service provider or other service provider to receive an allocation of one or more assets or asset resources within an asset computing environment. In some embodiments, the terms "tenant" and "tenant computing environment" are interchangeably used even though, in some cases, a tenant represents a party, parties, or entities while the tenant computing environment represents one or more computing resources that are used by or that are at least partially under the control of the tenant.

Hardware Architecture

FIG. 1 illustrates a block diagram of a production environment 100 for correlating virtual asset patterns or data with external events by generating and maintaining an external events identification library, according to one embodiment. The production environment 100 initializes an external events library with patterns, e.g., operations patterns or data patterns, from virtual assets that are generated during one or more external events, such as natural disasters, sporting events, wars, acts of terrorism, or the like, according to one embodiment. The production environment 100 maintains and develops the events library by continuously or periodically adding additional patterns from virtual assets that are generated during the external events, according to one embodiment. The production environment 100 can acquire patterns from virtual assets by pulling the patterns from the virtual assets when external events are detected, or by configuring the virtual assets to periodically push patterns to a virtual asset manager, according to one embodiment. The production environment 100 supports self-monitoring and self-healing virtual assets by providing a library of external events that may match one or more virtual asset patterns, e.g., anomalies, aberrations, and/or deviations in operational data for the virtual assets, according to one embodiment.

Self-monitoring and self-healing virtual assets can detect patterns, e.g., data patterns or operational patterns, that are inconsistent with historical operations or historic operating patterns for a particular virtual asset. The virtual asset can be configured to compare the deviant patterns against one or more security threat libraries/databases to determine whether the deviant patterns are consistent with a known or characterized security threat. However, if the virtual asset detects deviant patterns that are both inconsistent with historical operating patterns and that do not match security threat database patterns, the virtual asset can fall short of operating autonomously of a system administrator, security personnel, or other human resources. Unexplained operating patterns can be indicative of service failures, hacker activity, or other grave issues, so unexplained operating patterns may, by default, result in automated requests for support by human resources. Providing an external events library enables the self-monitoring and self-healing virtual assets to operate smarter, e.g., more autonomous of human resources, and properly react to deviations in historic operating patterns, according to one embodiment.

The production environment 100 enables self-monitoring and self-healing virtual assets to troubleshoot and/or dismiss detected patterns that are inconsistent with historic operating patterns for the virtual assets, by providing an event library of patterns that correlate with external events, according to one embodiment. The production environment 100 includes an asset management computing environment 110, which includes an event library 120, an event library manager 130, an event source module 140, and a global operational history library 150, according to one embodiment. The production environment 100 also includes a first asset container 160 and a second asset container 180, which represent one or more sets or perimeters of virtual assets that are organized or grouped by function, class, or other common characteristic, according to one embodiment. The asset management computing environment 110, the first asset container 160, and the second asset container 180 are communicatively coupled via one or more networks 190, according to one embodiment.

The event library 120 provides virtual assets with a correlation between virtual asset patterns and external events, according to one embodiment. The event library 120 can support virtual assets in recognizing seasonal, periodic, and random external events by storing patterns that were generated by virtual assets during one or more external events, according to one embodiment. The event library 120 is updated with external events and their corresponding virtual asset patterns continuously, periodically, or as external events occur, according to one embodiment. The event library 120 is implemented as one or more tables, a database, or one or more other data structures, to organize and/or map external events to their corresponding one or more sets of virtual asset patterns, according to one embodiment.

Examples of virtual asset patterns that are collected, analyzed, and mapped to external events include any event, trigger, and/or deviation from a desired, nominal, or predetermined operation of a virtual asset, according to one embodiment. In various embodiments, the patterns can include combinations of one or more of: available network bandwidth, denial of request to instantiate or terminate other virtual assets, processor usage percentage, memory usage percentage, number of queries, types of queries, quantity of traffic with respect to a mean or average, number of users, failure to communicate with other asset containers, receipt of a network message from a location known to be associated with malicious entities, frequency of outgoing network messages, communications with destinations that are not associated with a customer location of record, frequency of login attempts, frequency of failed login attempts, a size of parameters sent to the virtual asset, a size of outgoing network messages, a total quantity of data in any one communication, failure to perform important or critical operations, and other virtual asset operations discussed herein, and/or as known in the art at the time of filing, and/or as developed/made available after the time of filing. As discussed below, each of the virtual assets of the first asset container 160 and the second asset container 180 is configured to self-monitor virtual asset operations and communications, self-report patterns detected within the virtual asset operations to the asset management computing environment 110, and/or to save the detected patterns to one or more libraries or databases, according to various embodiments.

The event library 120 may organize all external events into two categories: computing environment external events 121 and computing environment internal events 122, according to one embodiment. The computing environment external events 121 represent events that occur external to, away from, or outside of a computing environment hosting one or more virtual assets, e.g., the second asset container 180, according to one embodiment. The computing environment internal events 122 represent events that are external to a virtual asset, but that occur internal to, within, or at a computing environment that hosts virtual assets, according to one embodiment. Examples of computing environments that host virtual assets include, but are not limited to, data centers, computer rooms, server cabinets, or other facilities used to house computing systems for hosting virtual assets.

The computing environment external events 121 can be organized into two or more sub-categories, according to one embodiment. For example, a first sub-category of external events can include random events, and the second sub-category of external events can include periodic/seasonal events. Examples of random events include, but are not limited to, war (e.g., Syrian Civil War), terrorism (e.g., intentionally downed passenger airplanes), and infrequently occurring natural disasters (e.g., volcanoes and earthquakes). Examples of periodic/seasonal events include, but are not limited to, sporting events (e.g., the World Cup), political events (e.g., presidential elections), and natural disasters (e.g., typhoons, hurricanes, tornados).

The computing environment external events 121 can be associated with various virtual asset patterns, according to various embodiments. For example, a virtual asset hosting streamed multimedia services may detect a decrease in network services or network bandwidth for an abnormal duration of time and at an abnormal time of day. When the virtual asset compares the data pattern of decreased network services or bandwidth against a security threat database, the changes in network services or bandwidth may insufficiently correlate with a denial of service attack or other known security threat. However, the event library 120 may have the time of day, the month of the year, and/or other time-related characteristics mapped to a periodic external event such as the World Cup or a United States presidential inauguration, which may be heavily viewed through multimedia services and decrease network bandwidth. Various other external events can result in heavy loads to multimedia outlets or service providers. For example, an outbreak of a war, the shooting down of a passenger airplane, a meltdown of a nuclear power plant, or other external event can result in significant increases in Internet usage and/or streaming content demands, resulting in decreased network resource availabilities. By providing the virtual asset with a justification and a duration of the periodic external event, or by providing notification of a world event or emergency that explains/justifies increased loading to network resources, the virtual asset can postpone false-positive alerts, i.e., alerts about events that are unsolvable or not permanently problematic to the virtual asset, according to one embodiment.

The computing environment internal events 122 include malicious software, natural disasters, and/or miscellaneous events, according to various embodiments. Malicious software ("malware") includes, but is not limited to, viruses, worms, Trojans horses, denial of service ("DOS") attacks, spoofing, pharming, and/or any other computer code deployed with malicious intent. A virtual asset may detect an abnormal pattern when the virtual asset attempts to communicate with other, regionally separated, virtual assets. For example, services provided in particular regions, e.g., Asia, South America, etc., may have language packs built into the virtual asset services, and the language packs may have one or more vulnerabilities to malware that have been exploited by hackers. The vulnerabilities may manifest themselves to virtual assets in other regions as abnormally slow response times, rejections of requests for information, or failures to perform pre-established security updates or check-ins, according to various embodiments. The event library 120 includes correlations between virtual asset patterns and region-based or function-based external events that affect computing environments, according to one embodiment.

Natural disasters that can affect the computing resources physically located in a computing environment, e.g., a data center, include, but are not limited to, earthquakes, tornadoes, torrential rainfall, floods, and hurricanes. These external events can interfere with the operations of one or more virtual assets by disrupting or destroying power or communication pathways to a computing environment or to network resources used by the computing environment to communicate with other geographic locations. Even if a computing environment includes resources for providing emergency backup power, a tornado, earthquake, or hurricane can physically remove communication pathways between a virtual asset located in a first computing environment and a virtual asset located in a second computing environment. The destruction or isolation of an entire computing environment, due to a natural disaster, can be mapped to the virtual asset patterns in the event library 120, according to one embodiment. A mapping or correlation of virtual asset patterns to the destruction or isolation of an entire computing environment may be represented by denial of service from the isolated computing environment, failure to establish connections to the isolated computing environment, and/or an abrupt loss of incoming data or information from the isolated computing environment, according to various embodiments. By submitting a detected pattern to the event library 120, a virtual asset may receive confirmation that the reason for failed communications is the isolation of a remotely located computing environment, rather than the invasion of a security threat, according to one embodiment.

Miscellaneous events that are internal to a computing environment can include times when neighboring computing systems, virtual assets, or computing environments consume disproportionately large quantities of resources, e.g., network bandwidth. The disproportionately large consumption of resources can be due to extraordinary success of an application hosted by the neighboring computing system, or can be indicative of a DOS attack on the neighboring computing system, according to various embodiments. The event library 120 can be updated to include security threat breaches occurring in computing systems that share a computing environment, e.g., a data center, with a virtual asset, according to one embodiment. Thus, when the virtual asset detects a pattern such as a decrease in data center resources, the virtual asset can confirm that it has not been compromised to a security threat, but instead can confirm that the neighboring computing system has been compromised, according to one embodiment.

The event library 120 enables virtual assets of the first asset container 160 and the second asset container 180 to proactively redistribute services to unaffected resources, according to one embodiment. For example, if a virtual asset in the first asset container 160 detects a pattern that the event library 120 correlates to a political event, sporting event, or other external event that will reduce a quality of services the virtual asset can provide, the virtual asset can be configured to instantiate a new virtual asset or be configured to transfer service hosting to a virtual asset in the second asset container 180, which may not be affected by the external event, according to one embodiment. As another example, if a virtual asset in the first asset container 160 uses virtual assets in the second asset container 180 to provide duplicative or backup services, and the virtual asset in the first asset container 160 detects a pattern that the event library 120 correlates to a destruction or isolation of the second asset container 180, the virtual asset in the first container 160 can be configured to instantiate one or more new virtual assets in another asset container, e.g., a third or fourth asset container, so that the virtual asset ensures duplicative services are provided, according to one embodiment.

The event library manager 130 initializes and updates the event library 120, according to one embodiment. The event library manager 130 includes event library policies 131, and initialization engine 132, a maintenance engine 133, and a virtual asset interface 134 for initializing and updating the event library 120, according to one embodiment.

The event library policies 131 determine how and when the event library 120 is initialized, updated, and distributed to virtual assets within the production environment 100, according to one embodiment. The event library policies 131 include an initialization policy 135, a maintenance policy 136, and a distribution policy 137, according to one embodiment. The initialization policy 135 defines how the event library 120 is initially populated, according to one embodiment. In some implementations, the event library 120 is manually populated, i.e., seeded, with example or approximate patterns for natural disasters or other external events for which patterns have yet to be acquired from virtual assets. In other implementations, the initialization policy 135 determines that patterns from a pre-determined number of events, e.g., two or more, it is required prior to populating the event library 120 with patterns for a particular type of event, e.g., a hurricane.

The maintenance policy 136 defines how the event library 120 is updated/maintained, according to one embodiment. For example, the maintenance policy 136 determines that the event library 120 is updated each time a natural disaster occurs in a geographic region associated with an asset container, e.g., the first asset container 160 or the second asset container 180, according to one embodiment. In other implementations, the maintenance policy 136 determines that the event library 120 is updated periodically, e.g., once a week or once a month, to preserve network resources associated with the event library 120, to allow the event library 120 to be responsive to requests from virtual assets within the production environment 100, according to one embodiment.

To reduce the likelihood of updating the event library 120 with erroneous data, the maintenance policy 136 and/or the initialization policy 135 include rules specifying that any external event be verified by a predetermined number of sources, according to one embodiment. According to one embodiment, the maintenance policy 136 and/or the initialization policy 135 determine that the occurrence of an external event be verified by two or more independent and trusted sources, prior to updating the event library 120 to reflect the occurrence of an external event.

The distribution policy 137 defines the frequency and mechanism with which the contents of the event library 120 are distributed to the virtual assets of the first asset container 160 and the second asset container 180, according to one embodiment. The distribution policy 137 determines that the virtual assets are required to request and pull information from the event library 120, according to one embodiment. The distribution policy 137 determines that the asset management computing environment 110 is configured to push information from the event library 120 to the virtual assets as external events occur, according to another embodiment. In one implementation, the distribution policy 137 specifies that the asset management computing environment 110 pushes information from the event library 120 that is pertinent to the region in which the virtual assets are physically located, or that is pertinent to the region to which the virtual assets provide services.

The initialization engine 132 executes initialization policy 135 to populate the event library 120, according to one embodiment. The initialization engine 132 populates the event library 120 with external event information from the event source module 140 and with patterns from the global operational history library 150, according to one embodiment. In some implementations, the initialization engine 132 provides a graphical user interface for human resources to use while entering approximated patterns for external events. For example, the initialization engine 132 can be used to pre-populate or seed the event library 120 with approximate patterns that might occur if a data center in Florida were affected by a hurricane, if a data center in Oklahoma were affected by a tornado, if a data center in California were affected by an earthquake, and/or if a data center in Japan were affected by a tsunami, according to one embodiment.

The maintenance engine 133 executes the maintenance policy 136 to update the event library 120, according to one embodiment. The maintenance engine 133 updates the event library 120 with external event information from the event source module 140 and with patterns from the global operational history library 150, according to one embodiment. The maintenance engine 133 can be configured to perform continuous, periodic, or external event-driven updates of the event library 120, according to one embodiment.

The virtual asset interface 134 executes the distribution policy 137 to distribute the contents of the event library 120 to the virtual assets of the production environment 100, according to one embodiment. The virtual asset interface 134 is configured to provide a push mechanism, a pull mechanism, and/or a push-pull mechanism for distributing the contents of the event library 120 to the virtual assets, according to various embodiments. In one embodiment, the virtual asset interface 134 periodically pushes new contents of the event library 120 to the virtual assets. In one embodiment, the virtual asset interface 134 pushes new contents of the event library 120 to the virtual assets in response to the event library 120 being updated with new external event information.

The virtual asset interface 134 is also configured to populate the global operational history library 150 with patterns received from the virtual assets, according to one embodiment. The virtual asset interface 134 retrieves virtual asset patterns from the local operational history libraries of asset containers that are geographically located in the same region as the occurrence of an external event, according to one embodiment. The virtual asset interface 134 receives automatically generated report information from the virtual assets and stores the patterns from the reports in the global operational history library 150 for future reference and for potential implementation in the event library 120, e.g., in response to detection of a new external event.

The event source module 140 retrieves external event information for updating the event library 120 with the event library manager 130, according to one embodiment. The event source module 140 includes an event source engine 141, an event sources library 142, and an event source queue 143, according to one embodiment. The event source engine 141 retrieves descriptions and notifications of events from one or more web-based sources, in one embodiment. For example, the event source engine 141 retrieves security threat information from one or more computing security databases or repositories hosted by one or more computing security companies or agencies. As another example, the event source engine 141 retrieves natural disaster information from rich site summaries ("RSS feeds") provided by web-interfaces with websites for the national oceanic and atmospheric administration ("NOAA"), other government organizations, or other trusted sources of natural disaster information. The event source engine 141 retrieves and stores sporting event, political event, and other world event information and the periodicity of the events from one or more other media-based or government-hosted websites, according to one embodiment.

In one embodiment, the event source engine 141 stores the addresses, e.g., uniform resource locators, for the event sources in the event sources library 142, according to one embodiment. The event source engine 141 also stores time-related information for the external events in the event sources library 142, according to one embodiment. By storing time-related information with the periodic external events, the event source engine 141 can be configured to automatically search for particular types of events during particular years or during particular times of particular years, according to one embodiment. For example, by storing time-related information for presidential elections, the event source engine 141 can automatically search for trusted sources that provide information related to the presidential election. As another example, by storing time-related information for sporting events, the event source engine 141 can automatically search for trusted sources to provide information related to the World Cup, the World Series, the Tour de France, the Super Bowl, or other popular sporting events, according to various embodiments. The event source engine 141 stores retrieved external events in the event source queue 143. By storing retrieved external events in the event source queue 143, the event library manager 130 can selectively pull information for events from the event source queue 143, in accordance with the event library policies 131, e.g., periodically or continuously, according to various embodiments.

The first asset container 160 organizes, manages, and/or represents a set of one or more virtual assets, according to one embodiment. The set of one or more virtual assets of the first asset container 160 have one or more common characteristics, such as function, type, geographic location, and service provided, according to one embodiment. The set of one or more virtual assets of the first asset container 160 are of the same class and have the same, or similar, operational parameters, and/or are created by the same or similar virtual asset creation template, according to one embodiment. Examples of virtual asset classes include, but are not limited to, virtual machine classes; virtual server classes; virtual database or data store classes; self-monitoring virtual assets; application development process classes; and application classes, according to various embodiments. The first asset container 160 is a virtual private cloud that hosts the set of one or more virtual assets, according to one embodiment. The first asset container 160 can also be described as a virtual asset perimeter that represents physical and/or logical boundaries that are inclusive of some virtual assets and that are exclusive of other virtual assets, according to one embodiment. In one embodiment, the first asset container 160 is also configured to manage the set of one or more virtual assets by instantiating new virtual assets, terminating existing virtual assets, monitoring the virtual assets for potential issues, and healing/repairing the virtual assets.

The first asset container 160 includes a virtual asset 161, a virtual asset 162, a virtual asset 163, and an asset container manager 164, according to one embodiment. Although three virtual assets 161-163 are associated with the first asset container 160, it is to be understood that the first asset container 160 can include more virtual assets or fewer virtual assets, according to other embodiments. The virtual assets 161-163 can generically be referred to as "first", "second", and "third" virtual assets, according to one embodiment. The virtual assets 161-163 are an allocation of one or more hardware, software, and/or firmware resources to one or more tenants, according to one embodiment. The hardware, software, and/or firmware resources can be shared (e.g., allocated to or shared by multiple tenants), or the resources can be dedicated (e.g., allocated to a single tenant), according to one embodiment. The virtual assets 161- 163 can include any virtualized entity or resource, and/or virtualized part of an actual, or "bare metal" entity. In various embodiments, the virtual assets 161-163 include, but are not limited to, one or more virtual machines; virtual servers; instances implemented in a cloud computing environment; databases associated with a cloud computing environment; databases implemented in a cloud computing environment; services associated with, and/or delivered through, a cloud computing environment; communications systems that are used with, part of, or provided through, a cloud computing environment; and/or any other virtualized assets and/or sub-systems of "bare metal" physical devices.

The virtual assets 161-163 include a service 165, a service 166, and a service 167, respectively, according to one embodiment. The services 165-167 include, but are not limited to, one or more database services, application services, or other computing services, according to various embodiments. The services 165-167 can be private services that are restricted to the tenant of the virtual asset, can be public services that are available to one or more users, and/or can be asset services that are made available to one or more virtual assets or non-virtual assets associated with or represented by the asset containers 160 and 180, in one embodiment.

The virtual asset 161 includes modules for performing self-monitoring, self-healing, and self-reporting operations, according to one embodiment. The virtual asset 161 includes a self-monitoring module 168, a self-healing module 169, and a self-reporting module 170, according to one embodiment. The virtual asset 161 uses the self-monitoring module 168 to detect patterns and generate events for further resolution, according to one embodiment. In particular, the self-monitoring module 168 uses an analysis engine 171 to compare operational data 172 to patterns in the pattern library 173. The operational data 172 includes, but is not limited to: patterns based on requests/messages received by the virtual asset 161, messages transmitted by the virtual asset 161, geographical locations from which requests/messages originate before being received by the virtual asset 161, frequency of requests/messages received, quantity of requests/messages received, network characteristics, processor characteristics, and the like, according to various embodiments. The pattern library 173 can include patterns that are indicative of security threats and can incorporate all or part of the event library 120 to enable autonomous self-monitoring and self-healing by the virtual asset 161, according to various embodiments.

When the analysis engine 171 detects a pattern included in the pattern library 173, or when the analysis engine 171 detects a pattern that exceeds pre-determine thresholds for the operational data 172, the analysis engine 171 creates one or more events 174 for resolution by the self-healing module 169, according to one embodiment. The self-healing module 169 receives the events 174 from the self-monitoring module 168 and takes one of a number of actions to resolve the event 174. If the event 174 is a result of a pattern found in the pattern library 173, the self-healing module 169 uses the repair engine 175 to terminate communications with a particular external computing system, terminate an infected virtual asset, execute a software patch, reinstall a database or an application, or execute some other remedial action, according to various embodiments. If the event 174 is generated based on data patterns or operational patterns that are not found in the pattern library 173, the repair engine 175 transmits the patterns to the asset management computing environment 110 for comparison to the event library 120, according to one embodiment. If the patterns match an event in the event library 120, the asset management computing environment 110 responds to the repair engine 175 with information regarding the external event that correlates with the detected patterns. Based on the information received from the asset management computing environment 110, the repair engine 175 can nullify or ignore the event 174, according one embodiment.

The self-healing module 169 can also be configured to use the expansion engine 176 to resolve one of the events 174, according to one embodiment. For example, if the events 174 indicate that the virtual asset 161 is low on resources, the expansion engine 176 can communicate with the asset container manager 164 or with the asset management computing environment 110 to increase the computing resources allocated to the virtual asset 161, according to one embodiment. In another embodiment, if the events 174 indicate that the virtual asset 161 is low on resources, the expansion engine 176 can communicate with the second asset container 180 to instantiate another virtual asset to support the operations of the virtual asset 161. However, if the second asset container 180 is affected or compromised by an external event 181, such that the second asset container 180 is communicatively isolated or destroyed, the repair engine 175 can be configured to communicate with the asset management computing environment 110 to determine if the virtual asset 161 has been breached by a security threat, or to determine if the second asset container 180 has been affected by an external event, according to one embodiment.

The self-reporting module 170 includes a report generator 177 and an operational history library 178, according to one embodiment. The self-reporting module 170 uses the report generator 177 to transmit event notifications to system administrators, security personnel, and/or other human resources, according to one embodiment. The self-reporting module 170 saves patterns and the operational data 172 in the operational history library 178 to support requests for information from the asset management computing environment 110. For example, the self-reporting module 170 may periodically or continuously be configured to transmit parts of the operational history library 178 to the event library manager 130 to support the population and maintenance of the event library 120, according to one embodiment.

The asset container manager 164 is configured to instantiate new virtual assets, reallocate hardware, software, and/or firmware resources to the virtual assets 161-163, and terminate/delete existing virtual assets, according to various embodiments. In one implementation, the self-monitoring module 168, the self-healing module 169, and/or the self-reporting module 170 are incorporated into the asset container manager 164, and the asset container manager 164 monitors, heals, and reports the operations of all of the virtual assets within the first asset container 160, according to one embodiment.

Although not shown in detail, the virtual assets 162 and 163, as well as the other virtual assets of the production environment 100 may include similar features and functionality as the virtual asset 161, according to one embodiment. Although the virtual asset 161 is functionally described using various modules, engines, libraries, and the like, the functionality disclosed herein may be implemented in the virtual asset 161 using other hierarchical or organizational techniques, according to various embodiments.

The second asset container 180 includes similar virtual asset configurations as the first asset container 160, according to one embodiment. The second asset container 180 includes a virtual asset 182 that hosts a service 183, a virtual asset 184 that hosts a service 185, and an asset container manager 186 that manages the virtual assets 182 and 184, according to one embodiment. The first asset container 160 and the second asset container 180 represent virtual assets that are grouped or organized by class of operation, geographical location, type of service provided, operating system, or any other physical, logical, or functional characteristic, according to various embodiments. As described above, the external event 181 represents an external event that can disable, communicatively isolate, or otherwise affect the operation of the second asset container 180 and its corresponding virtual assets 182 and 184, according to various embodiments.

The network 190 can include one or more communication channels that enable the asset containers 160 and 180 and the asset management computing environment 110 to communicate information to one another, according to one embodiment. The network 190 can include, but is not limited to, a LAN, PAN, WAN, intranet, and the Internet, according to various embodiments.

Process

Figure 2:
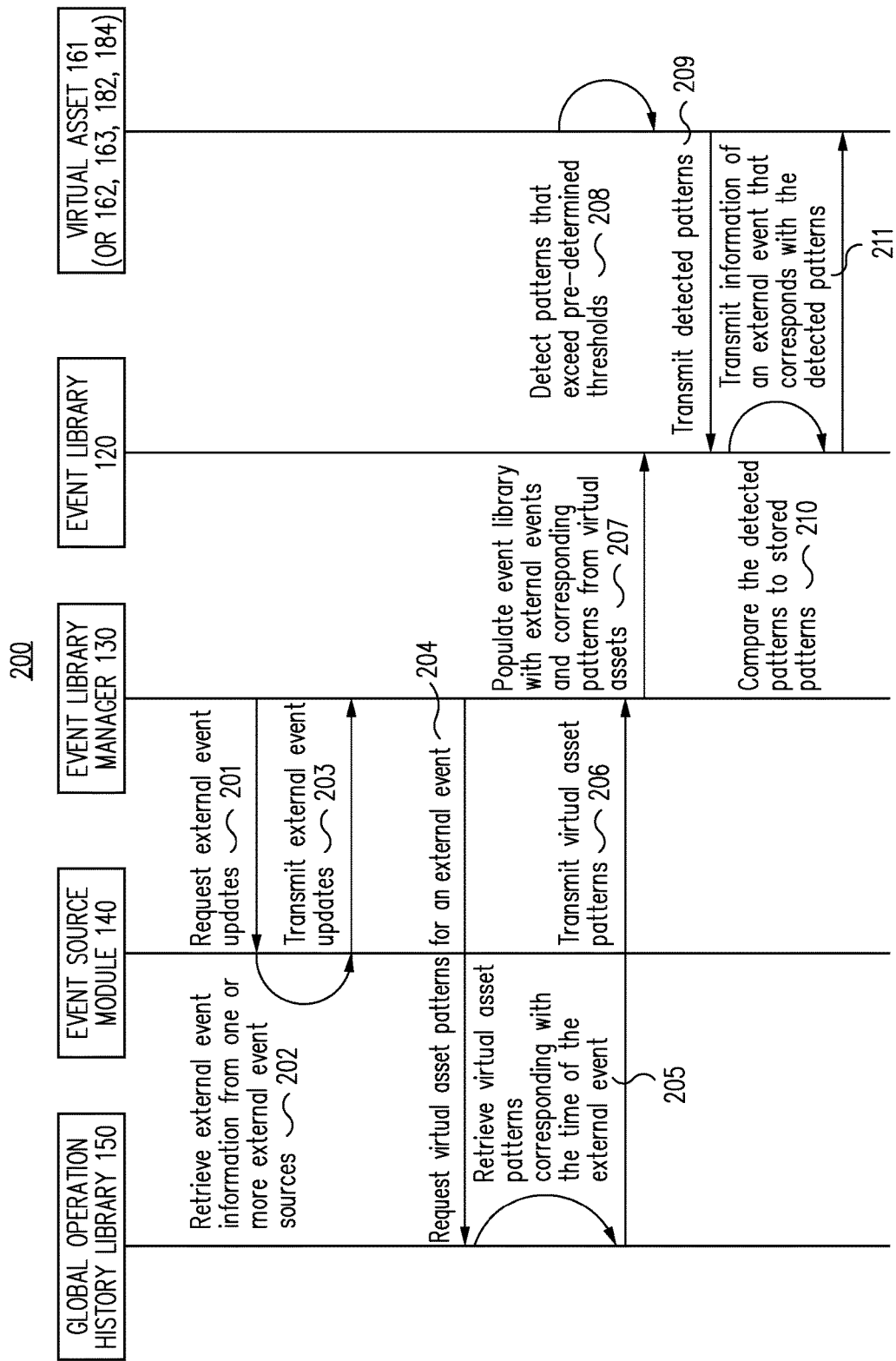
FIG. 2 is a flow diagram for correlating virtual asset patterns with external events, in accordance with one embodiment.

FIG. 2 illustrates a flow diagram of a process 200 of correlating patterns from virtual assets with external events using an event library, according to one embodiment.

At 201, the event library manager 130 requests external event updates from the event source module 140, according to one embodiment.

At 202, the event source module 140 retrieves external event information from one or more external event sources, according to one embodiment.

At 203, the event source module 140 transmits external event updates to the event library manager 130, according to one embodiment.

At 204, the event library manager 130 requests virtual asset patterns for an external event from the global operation history library 150, according to one embodiment. In other embodiments, the event library manager 130 requests virtual asset patterns for an external event directly from one or more virtual assets, e.g., virtual assets 161, 162, 163, 182, and/or 184.

At 205, the global operation history library 150 retrieves virtual asset patterns corresponding with the time of the external event, according to one embodiment.

At 206, the global operation history library 150 transmits the virtual asset patterns to the event library manager 130, according to one embodiment.

At 207, the event library manager 130 populates the event library 120 with external events and corresponding patterns from virtual assets, according to one embodiment.

At 208, the virtual asset 161 detects patterns that exceed pre-determined thresholds, according to one embodiment. While the virtual asset 161 is specifically used as an example, in other embodiments, the virtual assets 162, 163, 182, and/or 184 detects patterns that exceed pre-determine thresholds.

At 209, the virtual asset 161 transmits the detected patterns to the event library 120, according to one embodiment.

At 210, the event library 120 compares the detected patterns to stored patterns, according to one embodiment.

At 211, the event library 120 transmits information of an external event that corresponds with the detected patterns, to the virtual asset 161, according to one embodiment. By receiving information of an external event that corresponds with the detected patterns, the virtual asset 161 can confirm that the patterns are indicative of an external event rather than taking further action against a potential attack by a security threat, according to one embodiment.

Figure 3:
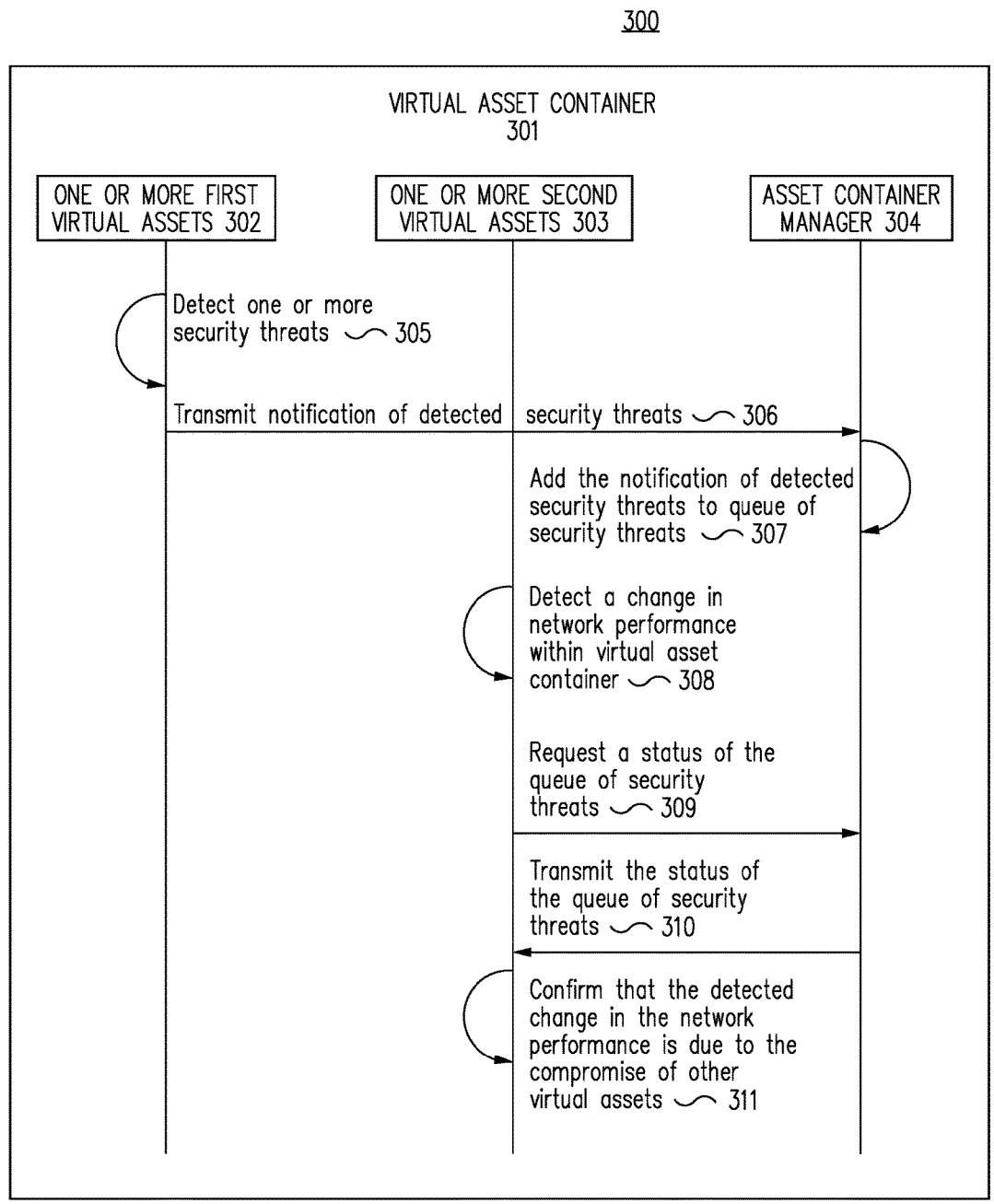
FIG. 3 is a flow diagram threat collection management within a virtual asset container, in accordance with one embodiment.

FIG. 3 illustrates a flow diagram of a process 300 for managing a collection of security threats within a virtual asset container 301, or other computing environment, according to one embodiment. The process 300 includes communications between one or more first virtual assets 302, one or more second virtual assets 303, and an asset container manager 304, according to one embodiment. The one or more first virtual assets 302 and the one or more second virtual assets through three can include one or more of the virtual assets 161-163, 182, and 184 (shown in FIG. 1), according to one embodiment. The asset container manager 304 can include the asset container manager 164 and/or the asset container manager 186 (shown in FIG. 1), according to one embodiment.

At 305, the one or more first virtual assets 302 detect one or more security threats, according to one embodiment.

At 306, the one or more first virtual assets 302 transmit a notification of detected security threats to the asset container manager 304, according to one embodiment.

At 307, the asset container manager 304 adds the notification of the detected security threats to a queue of security threats, according to one embodiment. In another embodiment, the asset container manager 304 adds the notification of the detected security threats to a collection of security threats. The collection of security threats may or may apply a specific ordering to the added security threats. Examples of ordering that the queue may apply to the notification of the security threats include, but are not limited to, ordering based on when the notification is received, size of the contents of the notification, and severity of the security threat that is associated with the notification.

At 308, the one or more second virtual assets 303 detect a change in network performance within the virtual asset container 301, according to one embodiment.

At 309, the one or more second virtual assets 303 request a status of the queue of security threats from the asset container manager 304, according to one embodiment. In another embodiment, the one or more second virtual assets 303 request a status of a collection of security threats from the asset container manager 304.

At 310, the asset container manager 304 transmits the status of the queue of security threats to the one or more second virtual assets 303, according to one embodiment. In another embodiment, the asset container manager 304 transmits the status of a collection of security threats to the one or more second virtual assets 303.

At 311, the one or more second virtual assets 303 confirm that the detected change in network performance is due to the compromise of other virtual assets, rather than due to the compromise of the one or more second virtual assets 303 according to one embodiment.

Figure 4:
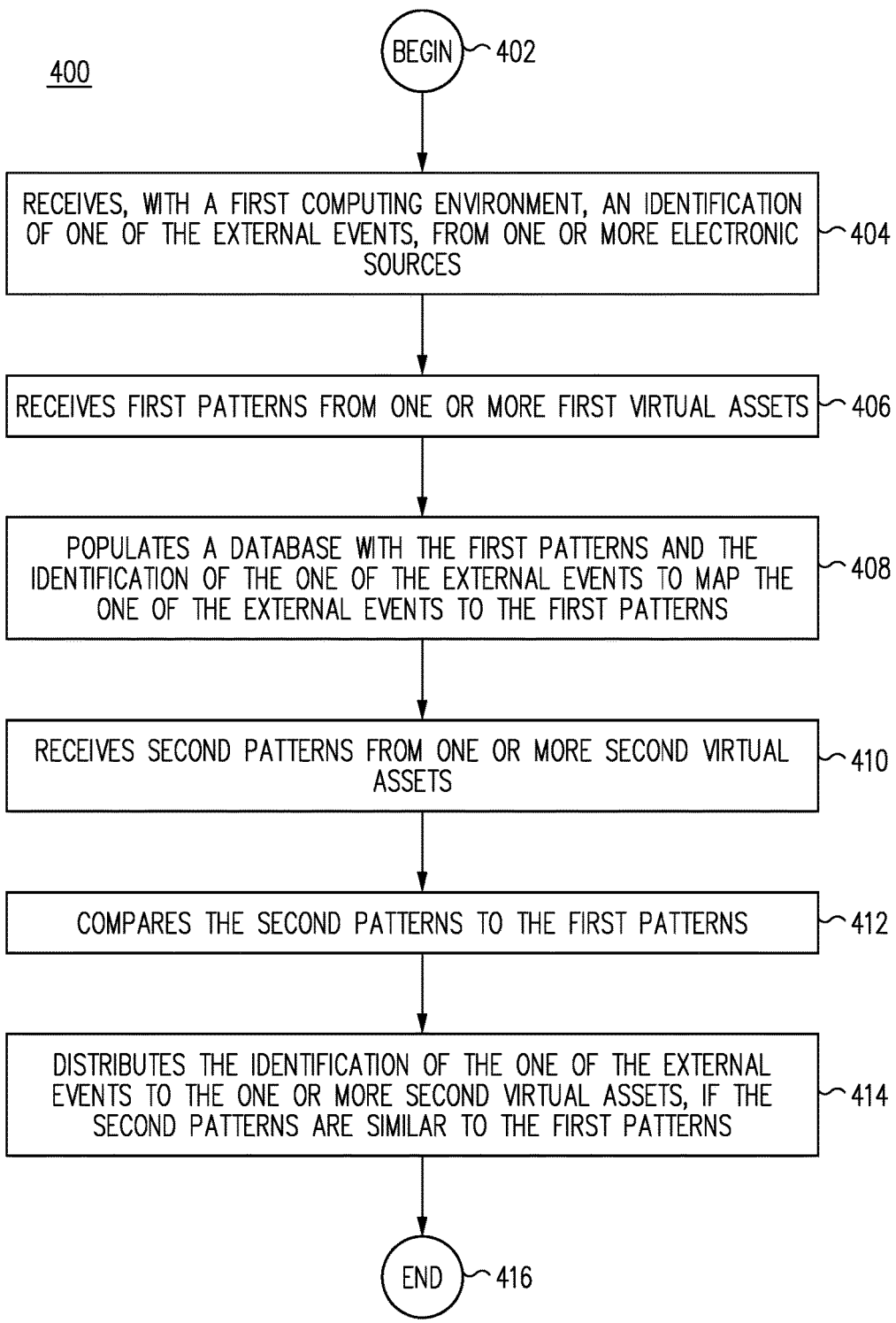
FIG. 4 is a flow diagram for correlating virtual asset patterns with external events, in accordance with one embodiment.

FIG. 4 illustrates a flow diagram of a process 400 for correlating virtual assets with external events, according to various embodiments.

At block 402, the process begins.

At block 404, receives, with a first computing environment, an identification of one of the external events, from one or more electronic sources, according to one embodiment.

At block 406, the process receives first patterns from one or more first virtual assets, according to one embodiment. Each of the one or more first virtual assets provides one or more computing services to one or more users, and each of the one or more first virtual assets includes an allocation of one or more hardware and software resources from a second computing environment, according to one embodiment. The first patterns represent first operational characteristics of the one or more first virtual assets, according to one embodiment.

At block 408, the process populates a database with the first virtual asset patterns and the identification of the one of the external events to map the one of the external events to the first virtual asset patterns, according to one embodiment.

At block 410, the process receives second patterns from one or more second virtual assets, according to one embodiment. The second patterns represent second operational characteristics of the one or more second virtual assets, according to one embodiment.

At 412, the process compares the second patterns to the first patterns, according to one embodiment.

At 414, the process distributes the identification of the one of the external events to the one or more second virtual assets, if the second patterns are similar to the first patterns, according to one embodiment.

At block 416, the process ends.

As noted above, the specific illustrative examples discussed above are but illustrative examples of implementations of embodiments of the method or process for correlating virtual assets with external events. Those of skill in the art will readily recognize that other implementations and embodiments are possible. Therefore the discussion above should not be construed as a limitation on the claims provided below.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented method for correlating virtual asset patterns with external events, comprising:

receiving, at a first computing environment, data identifying one or more external events currently occurring, from one or more electronic sources;

receiving first patterns from one or more first virtual assets providing one or more computing services to one or more users, each of the one or more first virtual assets including an allocation of one or more hardware and software resources from a second computing environment, the first patterns representing first operational characteristics of the first virtual assets and generated by the one or more first virtual assets during the occurrence of the external event;

mapping, by populating a database with the first patterns and the data identifying associated external events, external events to first patterns;

receiving a second pattern from a second virtual asset, the second pattern representing second operational characteristics of the second virtual asset, the second patterns being at least partially based on deviations by the one or more second virtual assets from the predetermined operating parameters;

determining, by comparing the second pattern to the first patterns to determine one or more first patterns similar to the second pattern, at least one external event associated with the second pattern; and distributing identifying data of the determined external events to the second virtual assets.

2. The method of claim 1, wherein the external events include at least one of a natural disaster, a world event, and a malicious software attack.

3. The method of claim 2, wherein the natural disaster includes one or more of a hurricane, a tornado, an earthquake, a tsunami, a typhoon, a volcano, and a flood.

4. The method of claim 2, wherein the world event includes one or more of a sporting event, an election, an act of terrorism, and a war.

5. The method of claim 2, wherein the malicious software attack includes one or more of a denial of service attack, a virus, a worm, a Trojans horse, spoofing, and pharming.

6. The method of claim 1, wherein the first and second operational characteristics include one or more types of messages received, quantities of messages received, geographic origins of messages received, frequencies of messages received, size of messages received, failed user account login attempts, processor usage percentages, denied access to a third computing environment, memory usage percentages, and network bandwidth.

7. The method of claim 1, wherein each of the one or more second virtual assets provides the one or more computing services to the one or more users, wherein each of the one or more second virtual assets includes an second allocation of one or more second hardware and software resources from a third computing environment.

8. The method of claim 1, wherein the second computing environment is a data center.

9. The method of claim 1, wherein the one or more electronic sources include websites or web-interfaces to one or more government agencies, media companies, and computing security companies.

10. The method of claim 1, further comprising:

determining if each of the one or more electronic sources satisfies a minimum threshold of trust, wherein receiving the identification of one of the external events includes receiving the identification, from the one or more electronic sources that satisfy the minimum threshold of trust.

11. The method of claim 1, further comprising:
increasing a number of the one or more electronic sources to enable improved verification of occurrences of the external events.

12. A computing system implemented method for managing a collection of security threats within a computing environment, comprising:
receiving, at the computing environment, a first security threat against a first virtual asset,
wherein the first security threat is detected by the first virtual asset,
wherein the first virtual asset is hosted by the computing environment,
wherein the first virtual asset represents an allocation of hardware and software resources within the computing environment for management by a tenant,
wherein the first virtual asset provides one or more services to one or more users;
adding the first security threat to the collection of security threats,
wherein the collection of security threats is hosted by the computing environment;
detecting, by the second virtual asset, a change in network performance within the computing environment, the change in network performance being at least partially based on deviations by one or more virtual assets from predetermined operating parameters;
receiving, responsive to detection of a change in network performance by the second virtual asset, a request from a second virtual asset for a status of the collection of security threats; and
transmitting, responsive to the request being received, the status of the collection of security threats to the second virtual asset.

13. The method of claim 12, wherein the computing environment is a virtual asset container that includes multiple virtual assets having one or more common functions, classes, and geographical locations.

14. The method of claim 12, wherein the status of the collection includes a list of recently detected security threats within the computing environment.

15. The method of claim 12, wherein the collection is a queue that includes an ordered list of all security threats detected within the computing environment.

16. The method of claim 12, wherein the changes in the network performance include decreases in available network bandwidth for use by the second virtual asset.

17. A system for correlating virtual asset patterns with external events, the system comprising:
at least one processor; and
at least one memory coupled to the at least one processor, the at least one memory having stored therein instructions which, when executed by any set of the at least one processors, perform a process for correlating virtual asset patterns with external events, the process including:
receiving, at a first computing environment, data identifying one or more external events, from one or more electronic sources;
receiving first patterns from one or more first virtual assets
providing one or more computing services to one or more users, each of the one or more first virtual assets includes an allocation of one or more hardware and software resources from a second computing environment, the first patterns representing first operational characteristics of the first virtual assets and generated by the one or more first virtual assets;
mapping, by populating a database with the first patterns and the data identifying associated external events, external events to first patterns;
receiving a second pattern from a second virtual asset, the second pattern representing second operational characteristics of the second virtual asset, the second pattern being at least partially based on a deviation by the second virtual asset from predetermined operating parameters;
determining, by comparing the second pattern to the first patterns to determine one or more first patterns similar to the second pattern, at least one external event associated with the second pattern; and
distributing identifying data of the determined external events to the second virtual assets.

18. The system of claim 17, wherein the external events include at least one of a natural disaster, a world event, and a malicious software attack.

19. The system of claim 18, wherein the natural disaster includes one or more of a hurricane, a tornado, an earthquake, a tsunami, a typhoon, a volcano, and a flood.

20. The system of claim 18, wherein the world event includes one or more of a sporting event, an election, an act of terrorism, and a war.

21. The system of claim 18, wherein the malicious software attack includes one or more of a denial of service attack, a virus, a worm, a Trojans horse, spoofing, and pharming.

22. The system of claim 17, wherein the first and second operational characteristics include one or more types of messages received, quantities of messages received, geographic origins of messages received, frequencies of messages received, size of messages received, failed user account login attempts, processor usage percentages, denied access to a third computing environment, memory usage percentages, and network bandwidth.

23. The system of claim 17, wherein each of the one or more second virtual assets provides the one or more computing services to the one or more users,
wherein each of the one or more second virtual assets includes an second allocation of one or more second hardware and software resources from a third computing environment.

24. The system of claim 17, wherein the one or more electronic sources include websites or web-interfaces to one or more government agencies, media companies, and computing security companies.

25. A system for managing a collection of security threats within a computing environment, comprising:
at least one processor; and
at least one memory coupled to the at least one processor, the at least one memory having stored therein instructions which when executed by any set of the at least one processors, perform a process for managing the collection of security threats within a computing environment, the process including:
receiving, at the computing environment, a first security threat against a first virtual asset,
wherein the first security threat is detected by the first virtual asset,
wherein the first virtual asset is hosted by the computing environment, wherein the first virtual asset represents an allocation of hardware and software resources within the computing environment for management by a tenant, wherein the first virtual asset provides one or more services to one or more users;

adding the first security threat to the collection of security threats, wherein the collection of security threats is hosted by the computing environment;

detecting, by the second virtual asset, a change in network performance within the computing environment, the change in network performance being at least partially based on deviations by one or more virtual assets from predetermined operating parameters;

receiving, responsive to detection of a change in network performance by the second virtual asset, a request from a second virtual asset for a status of the collection of security threats; and transmitting, responsive to the request being received, the status of the collection of security threats to the second virtual asset.

26. The system of claim 25, wherein the computing environment is a virtual asset container that includes multiple virtual assets having one or more common functions, classes, and geographical locations.

27. The system of claim 25, wherein the status of the collection includes a list of recently detected security threats within the computing environment.

28. The system of claim 25, wherein the collection is a queue that includes an ordered list of all security threats detected within the computing environment.

29. The system of claim 25, wherein the changes in the network performance include decreases in available network bandwidth for use by the second virtual asset.

* * * * *